United States Patent
Francis et al.

(10) Patent No.: US 11,775,060 B2
(45) Date of Patent: Oct. 3, 2023

(54) SYSTEMS AND METHODS FOR HANDS-FREE SCROLLING

(71) Applicant: Athena Accessible Technology, Inc., San Mateo, CA (US)

(72) Inventors: Blake Francis, Redwood City, CA (US); Stephen Mattison, Bellingham, WA (US); David Chiu, Morgan Hill, CA (US)

(73) Assignee: Athena Accessible Technology, Inc., San Mateo, CA (US)

( * ) Notice: Subject to any disclaimer, the term of this patent is extended or adjusted under 35 U.S.C. 154(b) by 0 days.

(21) Appl. No.: 17/671,534

(22) Filed: Feb. 14, 2022

(65) Prior Publication Data

US 2022/0261073 A1 Aug. 18, 2022

Related U.S. Application Data

(60) Provisional application No. 63/149,958, filed on Feb. 16, 2021.

(51) Int. Cl.
*G06F 3/01* (2006.01)
*G06F 3/0485* (2022.01)

(52) U.S. Cl.
CPC .............. *G06F 3/013* (2013.01); *G06F 3/017* (2013.01); *G06F 3/0485* (2013.01)

(58) Field of Classification Search
CPC ........ G06F 3/013; G06F 3/017; G06F 3/0485; G06F 1/1686; G06F 15/0291; G06F 3/0346; G09G 5/34; G09G 5/00; G06T 3/0025; G06T 3/0012; G02B 27/0172
See application file for complete search history.

(56) References Cited

U.S. PATENT DOCUMENTS

| | | | |
|---|---|---|---|
| 5,850,211 A | 12/1998 | Tognazzini | |
| 6,421,064 B1 | 7/2002 | Lemelson et al. | |
| 6,886,137 B2 | 4/2005 | Peck et al. | |
| 8,643,680 B2 | 2/2014 | Baldwin et al. | |
| 9,148,537 B1 | 9/2015 | Currey et al. | |
| 9,335,819 B1 * | 5/2016 | Jaeger | G06F 3/0346 |
| 9,430,141 B1 | 8/2016 | Lu et al. | |
| 9,606,622 B1 * | 3/2017 | Brothers | G06F 3/013 |
| 9,817,477 B1 | 11/2017 | Taylor et al. | |
| 9,946,338 B2 | 4/2018 | Hayashi et al. | |
| 9,990,109 B2 | 6/2018 | Yoshizawa et al. | |
| 10,009,603 B2 | 6/2018 | Kellerman et al. | |
| 10,082,863 B2 | 9/2018 | Kempinski | |
| 10,306,311 B1 | 5/2019 | Knas et al. | |
| 10,317,994 B2 | 6/2019 | Abraham et al. | |
| 10,409,366 B2 | 9/2019 | Beri et al. | |

(Continued)

*Primary Examiner* — Richard J Hong
(74) *Attorney, Agent, or Firm* — Carr & Ferrell LLP

(57) ABSTRACT

Systems and methods for hands-free scrolling are disclosed herein. An example method includes detecting an eye movement or gaze of a user relative to content displayed on a display screen of the computing device, the content being arranged along a y axis of the display screen, determining that the user has viewed a portion of the content provided on the display screen and where along the y axis the eye movement or gaze is directed; and automatically scrolling the content on the display in response to the eye movement or gaze of the user in relation to the y axis.

39 Claims, 11 Drawing Sheets

(56) References Cited

U.S. PATENT DOCUMENTS

| | | | |
|---|---|---|---|
| 2012/0256967 A1* | 10/2012 | Baldwin | G09G 5/34 |
| | | | 345/684 |
| 2013/0232444 A1 | 9/2013 | Hegde | |
| 2014/0002352 A1* | 1/2014 | Jacob | G09G 5/00 |
| | | | 345/156 |
| 2014/0125585 A1* | 5/2014 | Song | G06F 3/013 |
| | | | 345/156 |
| 2014/0268054 A1* | 9/2014 | Olsson | G06F 1/1686 |
| | | | 351/209 |
| 2015/0128075 A1 | 5/2015 | Kempinski | |
| 2015/0206321 A1 | 7/2015 | Scavezze et al. | |
| 2015/0309565 A1* | 10/2015 | Beri | G06T 3/0025 |
| | | | 715/776 |
| 2016/0109946 A1 | 4/2016 | George-Svahn | |
| 2016/0124505 A1 | 5/2016 | Liu | |
| 2016/0171277 A1 | 6/2016 | Flaw et al. | |
| 2016/0179361 A1* | 6/2016 | Gujarathi | G06F 3/0485 |
| | | | 715/786 |
| 2016/0259405 A1* | 9/2016 | Wilson | G06F 15/0291 |
| 2017/0212583 A1 | 7/2017 | Krasadakis | |
| 2017/0228018 A1 | 8/2017 | Schaeferjohann | |
| 2017/0235360 A1 | 8/2017 | George-Svahn | |
| 2018/0165792 A1* | 6/2018 | Tavakoli | G06T 3/0012 |
| 2018/0307307 A1 | 10/2018 | Schmidt | |
| 2020/0074724 A1* | 3/2020 | Mathur | G02B 27/0172 |

\* cited by examiner

SYSTEMS AND METHODS FOR HANDS-FREE SCROLLING

CROSS REFERENCE TO RELATED APPLICATIONS

This application claims the benefit and priority of U.S. Provisional Application Ser. No. 63/149,958, filed on Feb. 16, 2021, which is hereby incorporated by reference herein in its entirety including all references and appendices cited therein.

FIELD

The present disclosure pertains to exemplary systems and methods for performing hands-free scrolling while a user reads or views content on their computing device.

SUMMARY

According to some embodiments, the present disclosure is directed to a method comprising detecting an eye movement or gaze of a user relative to content displayed on a display screen of the computing device, the content being arranged along a y axis of the display screen; determining that the user has read or viewed a portion of the content provided on the display screen and where along the y axis the eye movement or gaze is directed; and automatically scrolling the content on the display in response to the eye movement or gaze of the user in relation to the y axis.

According to some embodiments, the present disclosure is directed to a system comprising a display; an eye tracking device; and a controller comprising: a memory; and a processor communicatively coupled to the memory the memory storing instructions executable by the processor to detect, using output from the eye tracking device, eye movement of a user relative to content displayed on the display; determine that the user has viewed a portion of the content provided on the display; and automatically scroll the content displayed in such a way that the user is not required to manually scroll the content.

According to some embodiments, an example method can include establishing a plurality of zones for a display, presenting content on a display that includes lines of textual content, the display being segmented into one or more of the plurality of zones, tracking eye movement or gaze of an eye of a user who is reading the lines of textual content on the display, along with which of the plurality of zones the content is located within, and automatically scrolling the lines of textual content as the reader reads the lines of textual content as determined from the eye movement or gaze, wherein the automatic scrolling is based on scrolling parameters, each of the plurality of zones having different scrolling parameters.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION OF EMBODIMENTS

Overview

Figure 1A:
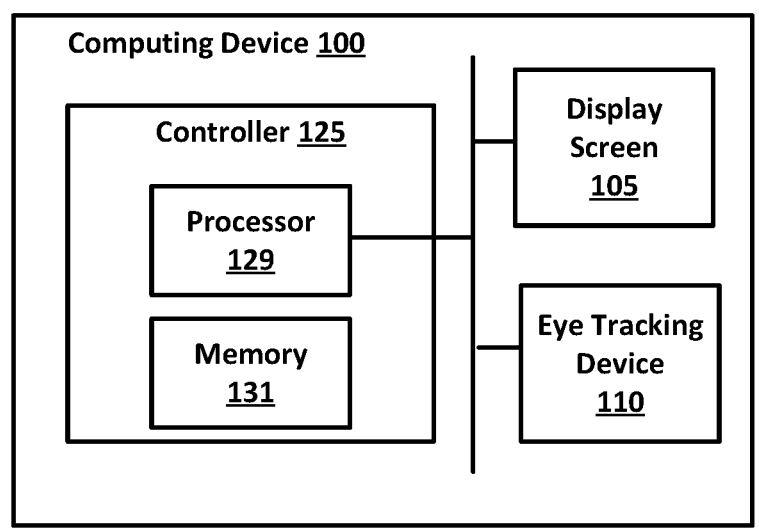
FIG. 1A illustrates an example schematic of a device that can be used to practice aspects of the present disclosure.

Traditional scrolling mechanisms are cumbersome, inefficient, unnecessary, can cause injury (such as repetitive use), and detracts from the user being able to consume and retain digital content. Traditional scrolling inputs are also limiting to people with disabilities, particularity of their fingers, hands, or arms. The present disclosure solves these issues, by providing systems and methods for performing hands-free scrolling while a user reads or views content on their computing device by tracking eye gaze.

Specifically, the technology allows for hands-free scrolling to reveal additional text or content to a user who is actively reading or viewing digital content on a computing device, such as a mobile phone, tablet, laptop, or any other type of computer having a display screen and a front-facing camera or other eye tracking device or apparatus. The computing device and displays can include both virtual reality and/or augmented reality devices.

The hands-free scrolling may, in some embodiments, provide the content at the rate that the user is reading as determined by the controller. The content being read by the user may include any type of content, including but not limited to, emails, news articles, electronic books, documents, webpage content, any text, ads, text messages, photos, and the like.

An example controller can be implemented by way of an application that is downloaded onto the computing device. In another embodiment the application can be integrated as a feature inside a web browser, a reader application, or alternatively, the controller can be implemented by way of an application that is part of the computing device's operating system. The controller utilizes a camera, virtual reality googles, an eye tracking device or any other type of device that can track eye movements, coupled to the computing device to track a user's eye(s) while reading or viewing of content. In some embodiments, the controller can utilize biometrics (or infrared) or any component that tracks facial features of the user, to enhance the accuracy of its detection and tracking of the user's eye(s) or direction of the user's gaze. In further embodiments, the controller can determine the reading or scrolling patterns/habits of a given user and incorporate that information in the controller's settings or tolerances in automatic scrolling, to mimic or adjust the hands-free scrolling to correspond with the user's patterns/habits. This in turn enhances the reading experience of the user. For example, if a user typically reads five lines of text or a full paragraph before scrolling, the automatic scroll process could mimic this behavior.

Example Embodiments

In one embodiment, once the controller tracks and determines that the user's eye(s) are moving right to left or alternatively, left to right, back and forth, line by line, similar to the movement that a typewriter performs upon input of a carriage return, then the controller determines that the user is actively reading and commands the computing device to scroll such as to reveal additional content or text to the user, without the user having to touch the computing device. That is, if the controller determines that the user's eye(s) have gone from left to right, and then left, the controller determines that the user has read one line of text. In further embodiments, the controller can determine if the user's eye(s) has gone up and down in the case of vertical content or text.

It will be understood that the present disclosure will generally refer to eye movement. This can include a pattern of eye movements, eye gaze, eye gestures, each of which will be described in greater detail infra.

Figure 1B:
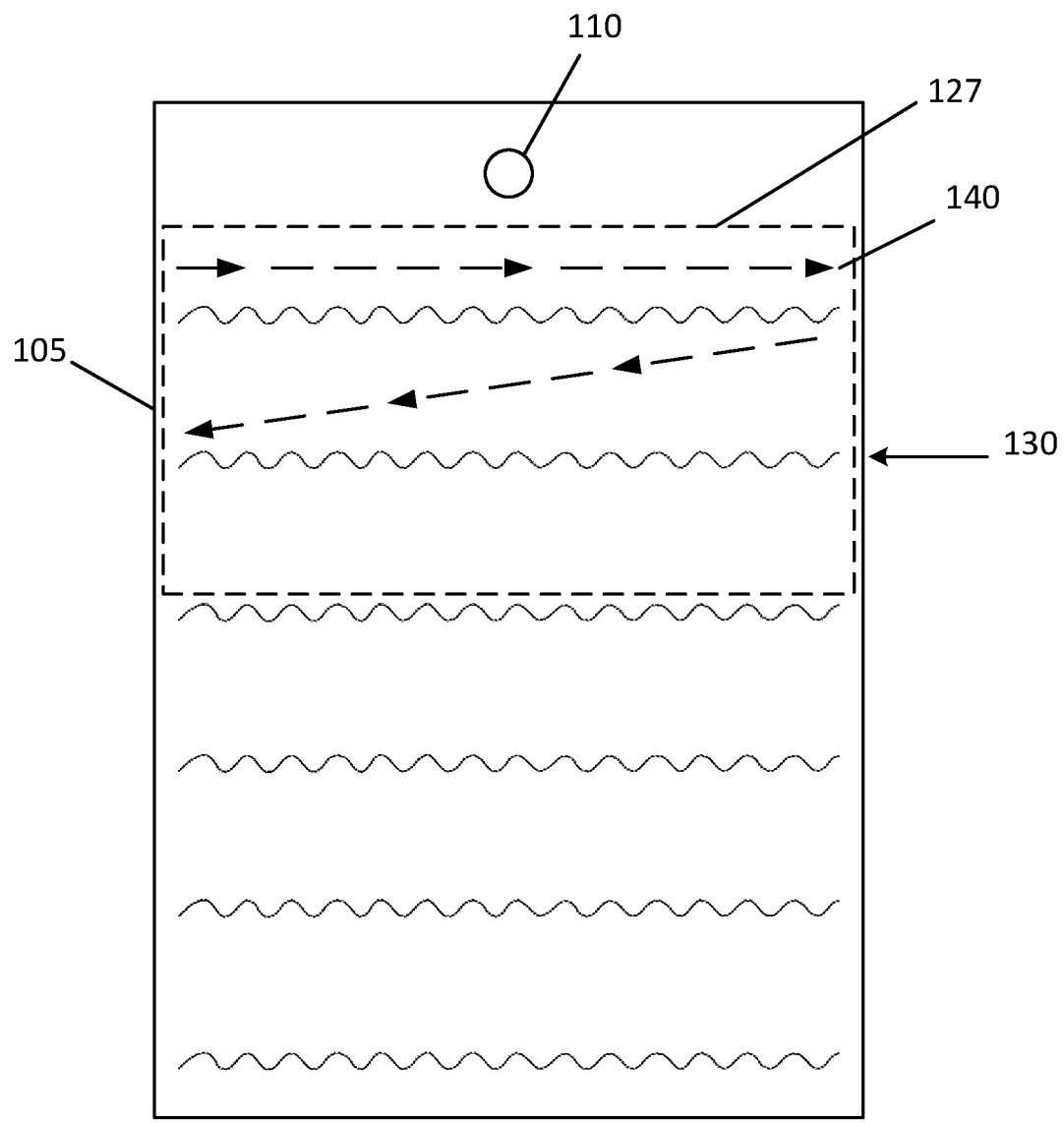
FIG. 1B illustrates an example device providing eye tracking and text scrolling.
Figure 1C:
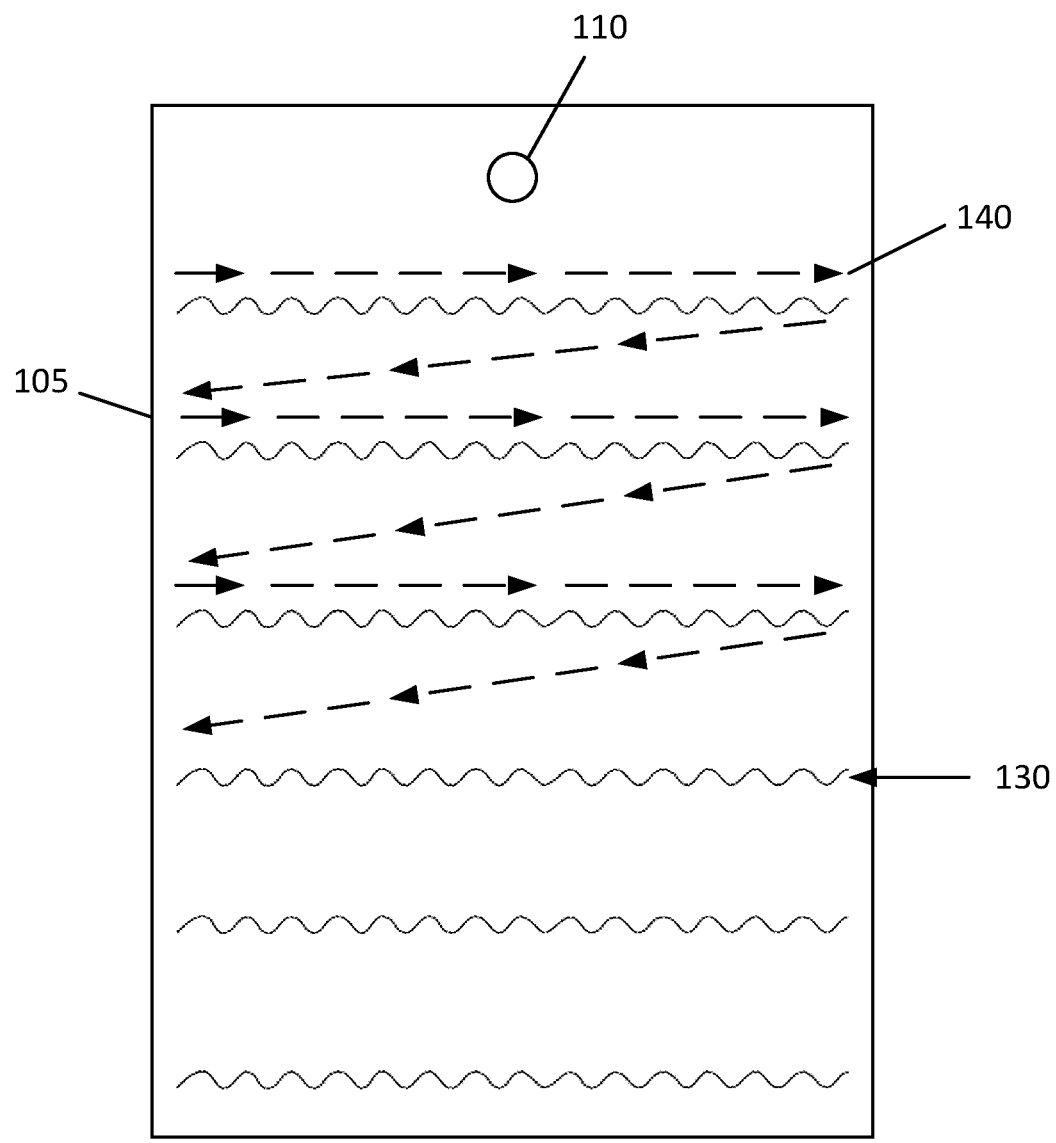
FIG. 1C illustrates another example device providing eye tracking and text scrolling.

Referring now to FIGS. 1A-1C collectively, which depict a block diagram of an exemplary architecture for hands-free scrolling, in accordance with certain embodiments of the present disclosure. As mentioned previously, the technology allows for hands-free scrolling to reveal additional text or content to a user who is actively reading or viewing content on a computing device 100, such as a mobile phone, digital screen, computer, glasses, heads-up display, tablet, laptop, or any other type of computer having a display screen 105 and a front-facing camera, or eye tracking device 110. The display screen 105 is configured to display any type of content, including but not limited to one or more lines of text 130.

For purposes of brevity and clarity, each of the embodiments may refer to operations performed by a controller. Thus, the computing device 100 can include a controller 125 having at least a processor 129 and memory 131. Broadly, the controller 125 is configured to provide the eye gaze tracking, scrolling, eye gesture features disclosed herein. The controller 125 can include a dedicated device that is specifically configured to enable the features of the present disclosure. In other embodiments, the controller 125 is an existing controller of the computing device 100 that can execute instructions stored in memory, such as an application.

Initially, the controller 125 can implement a calibration protocol. The controller 125 can cause the presentation of a calibration UI on the display. During this presentation, the controller 125 can determine, based on images obtained from the eye tracking device 110, when the user is looking at different points, symbols, words, or pictures that are highlighted on the display, to improve gaze accuracy for that user. In some embodiments, the controller 125 can display lines of scrolling text and track user eye gaze to determine how quickly the reader is reading the content. In some embodiments, the controller 125 can display lines of text to track the user eye movement pattern while reading.

In yet another embodiment, the controller tracks the location of a user's face in relation to the computing device. For example, the controller can determine where the user's face is located in relation to the computing device. The controller can determine if the user's face is located parallel to the screen of the computing device, as opposed to if the user's face is above, below or sideways in relation to the computing device, and also how far the user's face is from the screen. In other words, the controller can utilize such face-tracking mechanisms to determine where the user's eyes are focused on the screen, and then based on this information, the controller can determine if further hands-free scrolling is needed.

In yet a further embodiment, the controller determines the width of a user's eyes (how far apart a user's eyes are) to determine if hands-free scrolling is needed. For instance, if a user's eyes are further apart, then that user's eye movements may be shorter, and this can be detected by the controller.

In another embodiment, the controller can determine and track the sequence and/or the speed of a user's eye movements while they are reading text of one line, from left to right. The controller can determine and track the sequence and/or the speed of a user's eye movements while they are reaching the end of one line, and moving to the beginning of the next line. Based on these sequences, the controller can determine whether hands-free scrolling should be performed.

In some embodiments, the controller can make adjustments such as to compensate for a user wearing glasses, by handling refraction and/or reflection difficulties that can occur in such situations. Also, the controller can make adjustments where brightness or lighting issues arise.

The controller 125 can calculate a gaze estimation using head/face position relative to the device or display. For example, the controller 125 can determine that the user has viewed a portion of content presented in a target reading area of the display screen.

The controller 125 can determine that the user has viewed a portion of the content in a target reading area 127 of the display screen. The controller 125 can automatically scroll the content displayed in the target reading area 127.

The controller 125 can adjust scrolling behavior based on what is being displayed. When the controller 125 detects that there is no text on the display or mostly images, controller 125 can cause content to be scrolled based on gaze location focused on the top or bottom of the display. In some embodiments, scrolling can be accomplished by the controller 125 based on eye gesture detection. In yet other embodiments, the controller 125 can scroll UI content based on y coordinate reading detection. For example, if a line is read on the same y axis more than once, scrolling can stop as this would indicate the user is rereading the same line again. Stated otherwise, the display screen can be logically segmented off into a plurality of zones. The zones are arranged along a vertical axis, and can also be arranged along a horizontal axis as well. In some embodiments, the automatically scrolling of content can occur as the reader reads the content. This can be determined from the eye movement or gaze. In these instances, the automatic scrolling is based on scrolling parameters, each of the plurality of zones having different scrolling parameters. For example, viewing a first zone may cause the scrolling to occur at a first speed, whereas viewing content in a second zone may cause the scrolling to occur at a second speed. Viewing content in a third zone may cause the scrolling to occur at a third speed or the turning of a page (when paginated content is being viewed). Again, these are all merely examples, and the overall advantage is that each of the zones can be associated with scrolling parameters that produce a different scrolling behavior.

Still referring to FIG. 1A, the controller 125 tracks and determines that the user's eye(s) are moving right to left or alternatively, left to right, back and forth, line by line, with the assistance of the front-facing camera or eye tracking device 110. The eye tracking device 110 can comprise any combination of hardware and/or software that allows for the tracking of eye movement(s), eye gaze(s), using any technology that can be used to track the same.

Once the controller 125 determines that the user is actively reading, the controller 125 commands the computing device to scroll such as to reveal additional content or text to the user, without the user having to touch the computing device. Typically, the scrolling is in a downward or southward direction towards the bottom of the display screen. However, one skilled in the art can appreciate that scrolling can be in any direction and is not limited to a downward direction. In FIG. 1A, the controller 125 tracks and determines that the user's eye(s) are reading left to right, back and forth, in the direction of the arrows 140 depicted in FIG. 1B.

The controller 125 can provide this hands-free scrolling when it tracks and determines that the user's eye(s) have moved from the end of one line to the beginning of the next line of text that is displayed on the screen of the computing device. As the user's eye(s) are moving in this manner, and the controller 125 is following the direction of the user's eye(s), the controller 125 can control the computing device to display an appropriate amount of additional text that follows the text that is being currently read by the user.

For instance, FIG. 1C shows that the user has read three lines of text in a path depicted by the arrows 140 of FIG. 1C. Accordingly, the controller 125 will command the display to scroll another three lines of text 130. One skilled in the art that the number of lines of text 130 is not limited to just the number three, but instead, the controller 125 will determine the appropriate amount of additional text or lines of text that will be supplied to the user who is actively reading content based on a number of factors.

In some embodiments, the controller 125 further implements different tolerances to determine how much scrolling is needed, based on factors such as text size, the text and/or content that is being presented on the display, whether images and/or text are being displayed on the screen, line spacing and the like.

In various embodiments, the controller 125 can be configured to utilize machine learning, neural networks, artificial intelligence, and the like to evaluate screenshots of information provided on a UI to determine the contents of the UI. The screenshots can be fed into a trained neural network to identify UI elements on the screen in real-time. The controller can be configured to detect UI elements, texts, images or other content of on-screen display. In some instances, the controller 125 can utilize optical character recognition or other text scraping/identifying features to detect textual content and/or images. In some embodiments, UI element enumeration can be provided by target OS (operating system) including iPhone and android, which can be useful when an integrating application has source code access.

Figure 2:
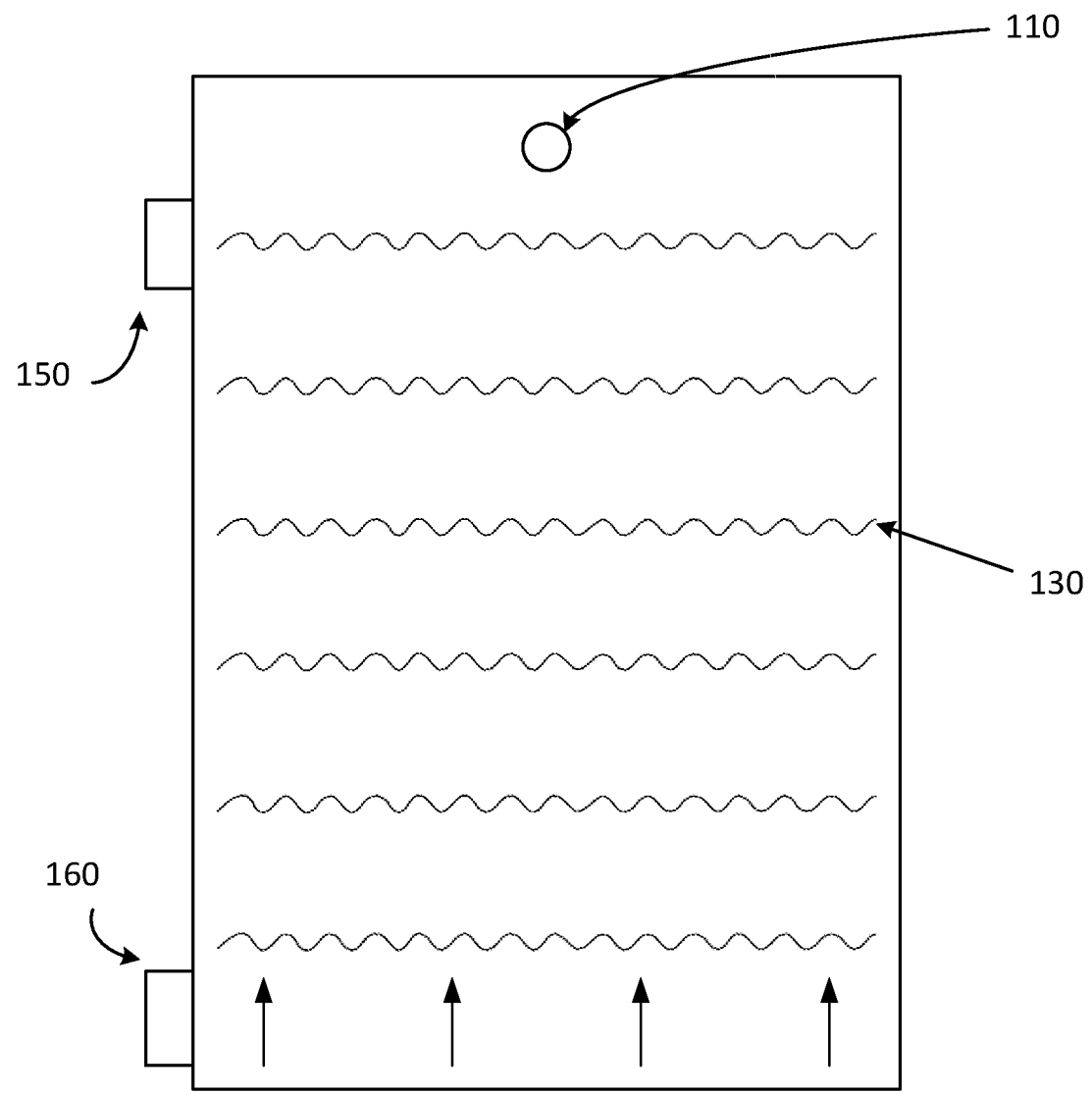
FIG. 2 illustrates dynamically detection of a given parameter such as line height, based on font size, line spacing, images and so forth.

In further embodiments, as shown in exemplary FIG. 2, the controller 125 is configured to dynamically detect a given parameter such as line height, based on font size, line spacing, images, and so forth. The controller 125 can determine the line height or the number of pixels 150 for a given line of text 130. Once the controller 125 makes this determination, the controller 125 can further adjust the scroll distance 160 depending on the line height that was determined by the controller 125.

In yet another example, the controller 125 can determine that the user has read five lines of text, then tracks that the user's eye(s) are looking at image displayed on the screen, and then tracks that the user is reading an additional three lines of text. Again, one skilled in the art can recognize that the controller 125 can determine any number of lines read by the user, and that the technology is not limited to merely five or three lines of text. In that example, the controller 125 will determine that the user is still reading despite having glanced at an image, and will display additional text and/or content that follows the three lines of text that were last read by the user. The controller 125 can also determine that scrolling should occur based on the content that is being displayed on the screen.

In another embodiment, the controller 125 tracks and determines that the user's eye(s) are focused on location of the screen (such as the top, middle or bottom portion of a display screen) or a zone. Based on that determination, the controller 125 can then determine that the scrolling distance should be increased, decreased, or stopped.

Figure 3:
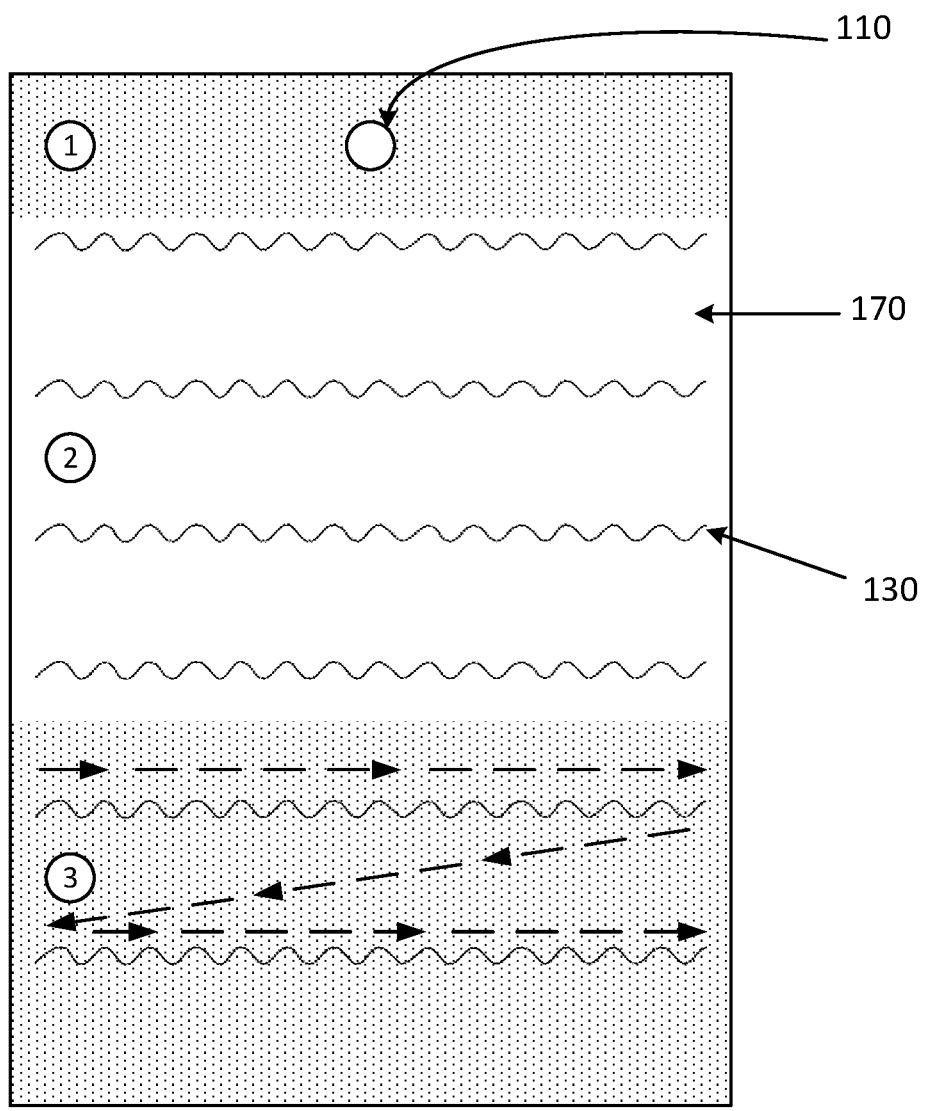
FIG. 3 illustrates a display with a plurality of zones.

FIG. 3 illustrates three exemplary zones or areas (Zone 1, Zone 2 and Zone 3) depicted on the display screen. If the controller 125 determines that the user's gaze is focused on Zone 1, or that the user is reading text 130 in Zone 1 (which in this case is the top of the display), the controller 125 may not start hands-free scrolling, decrease the scrolling distance, or stop the hands-free scrolling altogether, until the controller 125 detects that the user is now reading text 130 in Zone 2.

In some embodiments, the zone parameters pertaining to Zone 1 are selected to prevent the controller from scrolling too far or too quickly before the user has had a chance to read or view content. This helps keep the content in the desired viewing/reading area.

Alternatively, the controller 125 may slow down the hands-free scrolling or stop the hands-free scrolling altogether, until the user's gaze or eye(s) are detected to be focused in a desired (target) reading area 170 or if it is detected by the controller 125 that the user is reading in the desired reading area 170. The desired reading area 170 may be automatically determined by the controller 125 or it may be manually configured by the user through settings provided by the controller 125. For example, some users prefer to read text that is located at the top of the display screen, and therefore they may select that their desired reading area 170 is close to the top of the screen (such as the top ⅓ of the screen). On a tablet, computer, or a phone in landscape mode, the controller 125 may provide the content or text in a newspaper setting, where the content or text is provided in a newspaper layout (such as two narrow columns).

In another embodiment, in FIG. 3, the controller 125 may detect the user's eye(s) or gaze is focused on Zone 3 while the user is actively reading (which in this case is the bottom portion of the display screen). In this case, the controller 125 may increase the hands-free scrolling distance until the user's eye(s) or gaze is detected in Zone 2 or in the desired reading area 170. For example, the controller could scroll two lines of text for every one line of text that the user reads. In some instances, the parameters pertaining to Zone 3 ensure that the user does not run out of content or is not reading faster than the system is scrolling.

Figure 4:
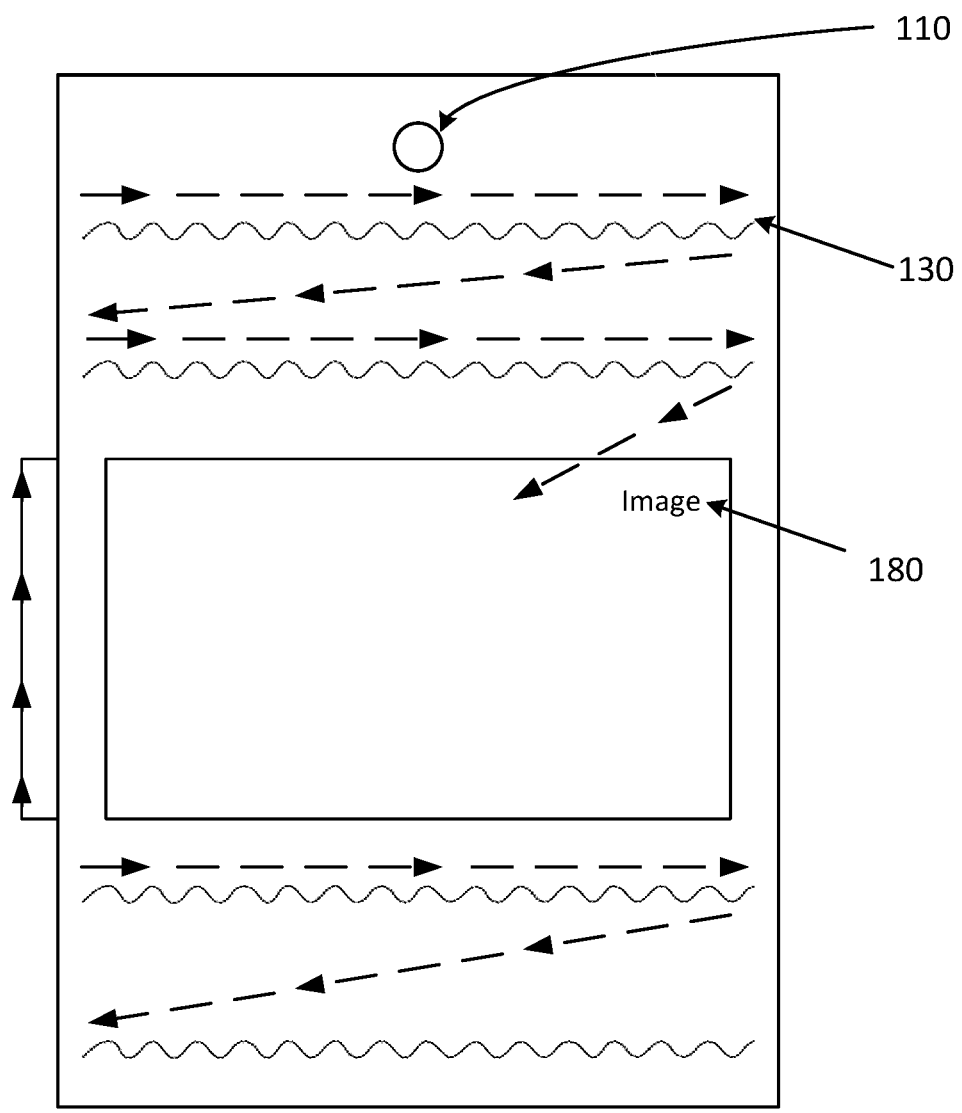
FIG. 4 illustrates aspects of eye tracking and dimensions of content on a display.

In a further embodiment, as shown in exemplary FIG. 4, the controller 125 may detect that the user is reading content or text 130 on the display screen of their computing device, again with the assistance of the camera or eye tracking device 110, and the automatic scroll is active. The user reads the content and once the user's eye(s) or gaze reaches an image 180, the controller will stop scrolling or slow down the speed of the scrolling. Once the controller 125 detects that the user is reading again, below or after the image, the controller 125 will scroll the equivalent distance as that of the size of the image 180. In other words, the controller 125 will provide hands-free scrolling of content or text that is the equivalent distance as that of the size of the image 180. In the exemplary case of FIG. 4, the controller 125 determines the dimensions, including the height, of the image 180, and based on that determination, the controller 125 can determine how many pixels are in a line of text or how many pixels are on a given page of content, and scrolls a given number or preset number of pixels once the user continues reading past the image 180. In one embodiment, the controller 125 can scroll a distance that is equal to the height of the image, once the user continues reading past the image 180.

Exemplary embodiments allow for continuous hands-free scrolling, regardless of whether the user has reached the end of a chapter or passage of content/text. Further embodiments allow for the controller 125 to determine how many lines of text that a user has read and provide the same number of lines of upcoming text or upcoming content. Also, the controller 125 can track the user's gaze, to determine if the user has skipped text, such that the controller 125 will increase the amount of scrolling (e.g., scroll distance) or the scrolling speed, such that the controller follows the direction of the user's gaze on the display screen.

Still referring to FIG. 4, if the initial screen or landing page begins with an image 180 at the top of the display, followed by text 130, once the controller 125 determines that the user has begun actively reading the content, the controller 125 can scroll an equivalent distance to the size of the image 180. In some embodiments, if the user's eye(s) or gaze reaches an advertisement shown on the display screen, and if the user had selected a mode called "Skip Ads" mode through the controller 125 (which is provided in the graphical user interface depicted in FIG. 5), then the controller 125 will automatically scroll the equivalent distance to the size of the advertisement that the user's eye(s) or gaze had reached.

Figure 5:
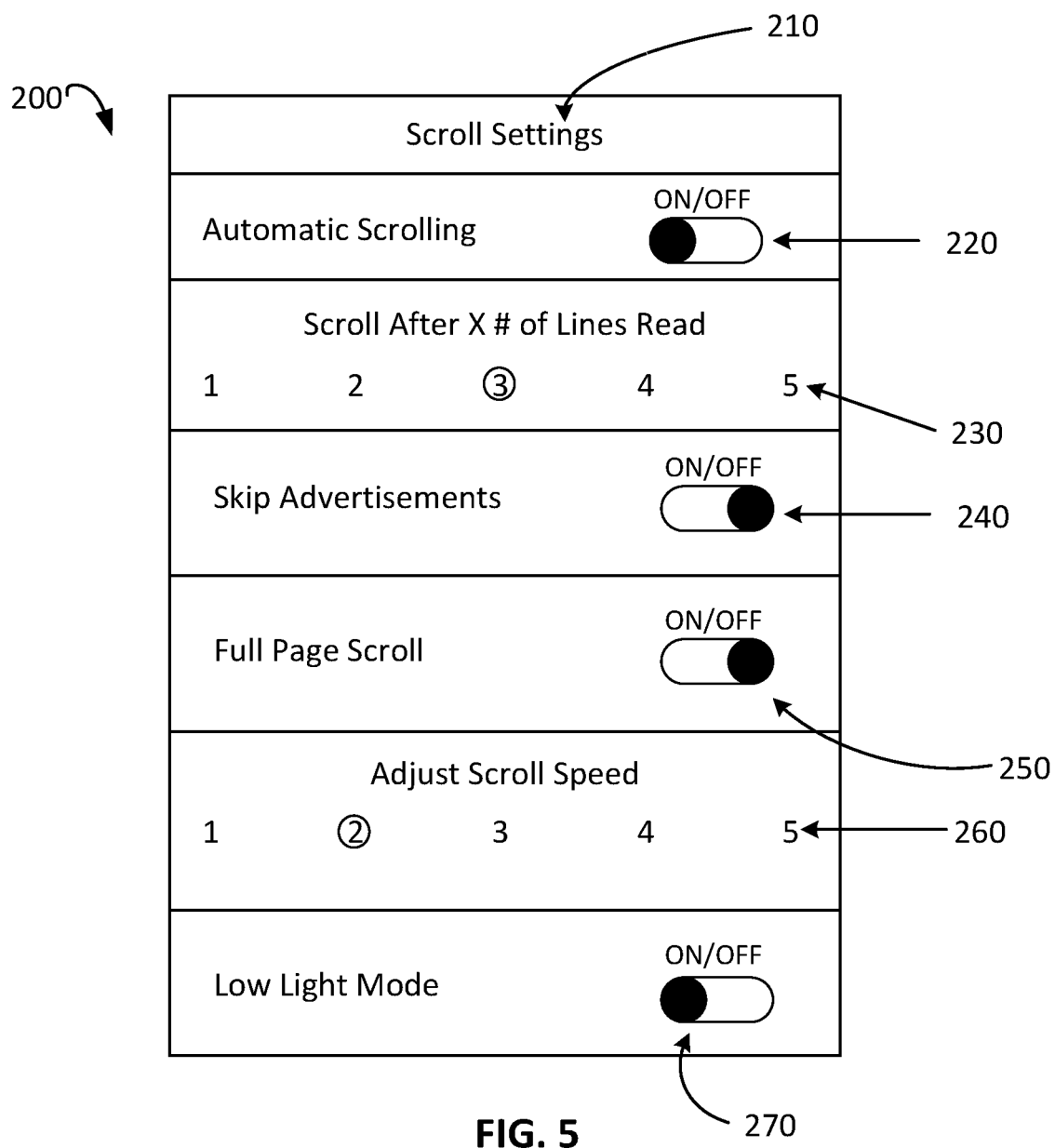
FIG. 5 is a flowchart of another example method of the present disclosure.

FIG. 5 depicts an exemplary graphical user interface (GUI) 200 that is provided by the controller 125. While this describes a UI that allows a user to preselect preferences, the controller 125 can be pre-programed with predetermined settings or default settings which do not require the user to make settings selections.

The GUI 200 comprises a scroll setting menu 210, and in the example provided in FIG. 5, the menu 210 provides six settings which the user can select. First, the user can select whether automatic scrolling should be on or off by sliding the on/off button 220 left or right. In the example shown in FIG. 5, the user has selected that the automatic scrolling is on. Next, the user can change how often the controller 125 scrolls by selecting a number 230 displayed on the GUI 200. In the example shown in FIG. 5, the user has selected that the controller 125 should scroll after 3 lines of text are read. Thus, the controller allows the user to manually adjust how the screen automatically scrolls (1, 2, 3, 4 or 5 lines) at a time.

Next, the user can select the "Skip Ads" mode, which was discussed earlier herein. The user can select whether the controller 125 should scroll past ads automatically. In the example provided in FIG. 5, the user has turned off the "Skip Ads" mode 240, so the controller 125 will not automatically scroll past ads.

Also, the user can select whether full page scrolling should be on or off by sliding the on/off button 250 left or right. If activated, once the user has read a page of content/text or one page worth of content that is displayed on the screen, the controller will scroll the next page of content or text to be displayed to the user. The controller may scroll one full page, or turn the page, or jump to the next page. In the example shown in FIG. 5, the user has selected that the full-page scrolling is off.

Next, the user can adjust the scroll speed of the controller, that is, how far the controller scrolls each line by selecting a level 260 displayed on the GUI 200. In the example shown in FIG. 5, the user has selected that the controller should scroll at a level of 2, where the spectrum of levels goes from level 1 to level 5. Level 1 means less distance, and level 5 refers to more distance.

Finally, still referring to FIG. 5, the user can select whether low light mode should be on or off by sliding the on/off button 270 left or right. When the low light mode is on, and the controller detects that the device is in a lowlight environment, the controller will brighten the display screen of the computing device to improve eye tracking accuracy. The controller may also lower the eye tracking tolerance to compensate for lower light eye tracking accuracy or a lower gaze accuracy in a lowlight setting. In the example provided in FIG. 5, the user has turned on the low light mode.

In some embodiments, the controller can automatically scroll digital content as the user is reading or viewing it or once the user has read or viewed it. The controller can further determine if automatic scrolling is accurate based on the manual scroll inputs of the user and can adjust accordingly. The controller may also automatically scroll digital content by mimicking the manual scroll behavior of the user, and it can detect whether the user is reading text on a digital device. The controller can automatically scroll when the user is actively reading and adjust the scroll distance based on where the user's eye(s) is currently gazing on the display screen. The controller is configured to stop scrolling if it detects that the user is not reading or viewing content on the display area. In further embodiments, the controller scrolls each line in a way that feels smooth and continuous to the user even when multiple lines are scrolled at once. The controller may also keep track of where text and images are in relation to the user gaze or where text and images are in relation to the display screen.

In another embodiment, the user can select a "skim" mode through the settings menu of the controller. In the "skim" mode, the controller scrolls faster and highlights important words. The highlighted important words can be highlighted with color or bolded. The highlighted important words may be only in the headers of text, rather than in the body of the text.

In some embodiments, an example controller can automatically scroll digital content as a person is reading or viewing the content (at the same rate which the person is reading or viewing) without the user having to touch the screen/without the user having to direct the computer to do so.

In one embodiment, an example controller can predict when to scroll a display based on certain eye movements or gestures, based on eye gaze tracking. In some instances, the example controller can automatically scroll digital content once the user has read or viewed such digital content.

An example controller can automatically scroll digital content by mimicking a manual scroll behavior of the user. The controller can detect when a user is reading text on a digital display and/or when a user is not reading text on a digital display. An example controller can detect when the user has read a line of text, by tracking one or both eyes of the user as they scan from left to right or left or left to right, while looking at display (or up and down in the case of vertical writing). The actual direction of reading or viewing is not limiting to this disclosure.

An example controller can automatically scroll a line of text once the user has read a line of text and/or reveal an additional line of text once the user has read a line of text. In some embodiments, an example controller can detect when a user is reading and can automatically scroll an equivalent distance to the number of lines read.

In some embodiments, a controller can determine when a user is not reading and can stop scrolling or not scroll, as well as automatically scroll when the user is actively reading and adjust the scroll speed or distance (number of pixels) based on what part of the display (y axis) the user is reading, such as when a user is actively reading below a certain point on the display the controller can increase the scroll speed or distance until the eye gaze is back to the desired location. Conversely, if the controller detects that the user is reading above a certain point on the display (top quarter) then the controller can automatically decrease or slow down (or even stop) the scroll distance/speed until the eye gaze is in the desired location.

Another example embodiment can learn the scroll behavior of a user and incorporate this behavior into the automatic scroll process, such as when a user is behaviorally known to read five lines of text before scrolling, the automatic scroll process could mimic this behavior or if a user typically reads a whole paragraph then scrolls. Thus, the controller can be adapted to learn a user's reading behaviors and control automatic UI scrolling in response.

In one embodiment, a controller as disclosed herein can adjust the automatic scroll distance and/or scroll behavior based on page content. For example, when a user is reading while the controller is automatically scrolling and the user gets to the end of a paragraph and starts a new paragraph, the controller may scroll one additional line to account for the paragraph space. In some embodiments, the controller can also adjust scroll distance/speed based on font size, pictures, and/or line spacing—just to name a few.

Some embodiments include a controller that allows a user to read or view content on a digital display without the user having to manually scroll to reveal additional content, or allows the user to manually adjust how the screen automatically scrolls any number of lines at a time.

In some embodiments, the controller is configured to combine together individual line scrolls to give a continuous smooth scrolling experience, as well as determine when there is an image on the screen and detect when the user is viewing the image. If the user is viewing an image on the display, the controller can stop scrolling or bring the image into full view if only a partial image is being displayed, or scroll until the image is in the middle or top of the display. The controller can track where text and images are on the UI in relation to the user gaze. Once the user has read one full page, scrolled one full page, or turned the page (with paginated content), the controller can determine if automatic scrolling is accurate based on manual scroll inputs of user and can adjust accordingly.

In some embodiments, the controller can automatically scroll a digital device a distance that is equivalent to the content that has been read or viewed. The user can select a "skim" mode which highlights important words and allows the user to read faster.

In some embodiments, the controller can detect when a user has read a line of text on a digital display and can automatically scroll the equivalent distance of the line of text read, the controller can increase the scroll distance or speed when the user is reading or viewing the bottom of the screen. The controller can decrease the scroll distance or speed when the user is reading or viewing the top portion of the screen, the controller can adjust the scroll distances based on the content that is being displayed on the screen.

In some embodiments, the controller can be automatically enabled when a user is viewing compatible content, such as longform text, articles, documents, webpages, email, news, books, multi-page feed, and so forth.

The controller can be configured to detect and control a display using eye gestures. An example implementation includes a touchless user interface (or touchless human computer interface) that uses human eye gestures and movements to command the computer. An example controller can control device inputs based on specific eye gestures, gaze location and the content layout displayed on the screen.

In some embodiments, these eye gestures can mimic the pattern of touch gestures. The controller can detect when a user has read all of the lines on the display and can skip/scroll to the next page. In another implementation, the controller can detect when user is focused on the next page (zone) or button and can automatically move to the next page or move right. In another implementation, the controller can skip to the next page or move right when controller detects a swipe left eye gesture.

In another implementation, the controller can return to a previous page when controller detects the previous page/scroll right eye gesture. In another implementation, the controller can detect when a user is reading or has read a line and can automatically scroll the device. In yet another implementation, the controller can detect if gaze is focused on a control zone for a certain period of time then will perform that control zone's action (scroll down/scroll up/next page/last page/back button).

In one implementation, the controller can detect if eye gaze is focused on a control button for a certain period of time then will cause execution of that control button's action (scroll down/scroll up/next page/last page/back button).

In one embodiment, the controller can detect an eye gesture that mimics touch gestures. For example, users can select which eye gesture corresponds with certain action or input and can also be controlled by voice or touch inputs, or any other operating system level controls.

The controller can detect if the user rereads a particular word or sentence more than once to determine comprehension and/or reading ability, or misunderstanding of work or sentence. When the y coordinate location changes from previous line read, then scrolling can continue. In some embodiments, the reading of a line may be considered a left to right gesture or left to right to left gesture.

Some example controllers can detect and track whether or not a user actually read a given word, sentence, paragraph, page, or document, in the case of signing a contract or agreement or a reading assignment.

Figure 6:
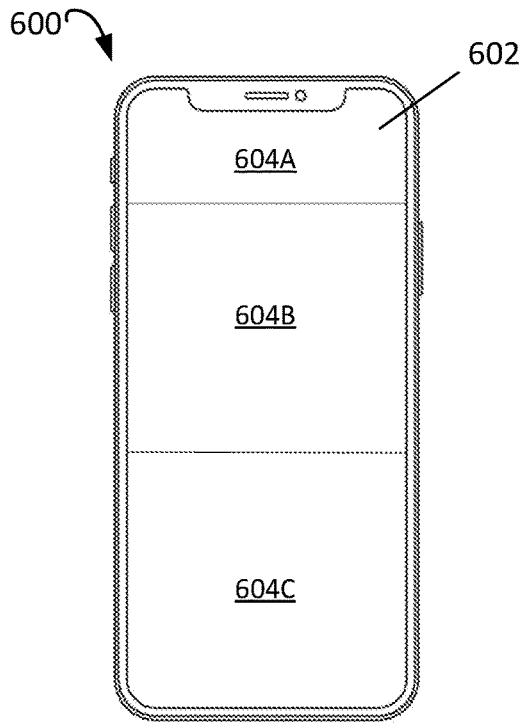
FIGS. 6-10 each illustrate the segmentation or zoning of a display screen in accordance with the present disclosure.

Referring now to FIG. 6, which illustrates an example mobile device 600 with a display 602 that is segmented into a plurality of zones 604A-604C. In general, a controller as disclosed herein can detect a gaze location of an eye of a user. The controller can determine which of the zones 604A-604C the eye gaze location is directed towards. Next, the controller can determine if the user is reading, for example, by detecting back and forth and downward eye movement. The controller can also determine which section of the display the user is reading from (e.g., a target reading area). In response, the controller can enact or cause automatic scrolling based on parameters. For example, if the user is reading in zone 604A, the controller may not scroll or may stop scrolling when a scrolling action is occurring. When the user is reading in zone 604B, the controller may scroll one line at a time (or in response to each line the user reads).

When the user is reading in zone 604C, the controller may scroll two lines at a time. Again, these selections are arbitrary and can be adjusted per user behaviors or stated preferences.

Figure 7:
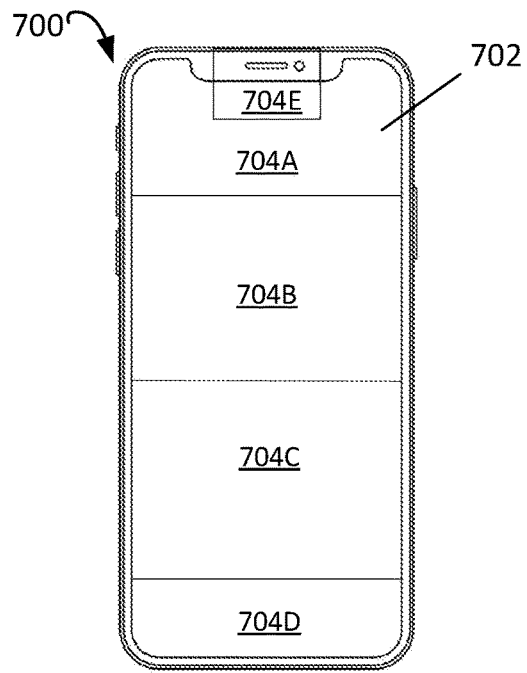

FIG. 7 illustrates an example mobile device 700 with a display 702 that is segmented into a plurality of zones 704A-704E. A controller responds to eye gaze in zones 704A-704C similarly to that which is stated above with respect to zones 604A-604C of FIG. 6. When the user's gaze is in zone 704D for a period of time, a controller may upwardly scroll the content displayed on the device until user's gaze is no longer detected in this section (or scroll predetermined number of lines similar to touch gesture scroll). It will be understood that the controller can use the same logic to provide a next page in the case of paginated content. Also, if an image is being partially displayed in 704D and gaze is detected the controller can scroll until the full image is in view, or until image is centered on the display.

When controller detects the user's gaze in zone 704E for a period of time, the controller can cause content to be scrolled down until the user's gaze no longer detected in zone 704E (or scroll predetermined number of lines similar to touch gesture scroll). It will be understood that the size and shape of each zone can vary and be adjusted (e.g., zone 704E could stretch across the entire display, or zone 704D could be a box in the center of the display, similar to zone 704E.

Figure 8:
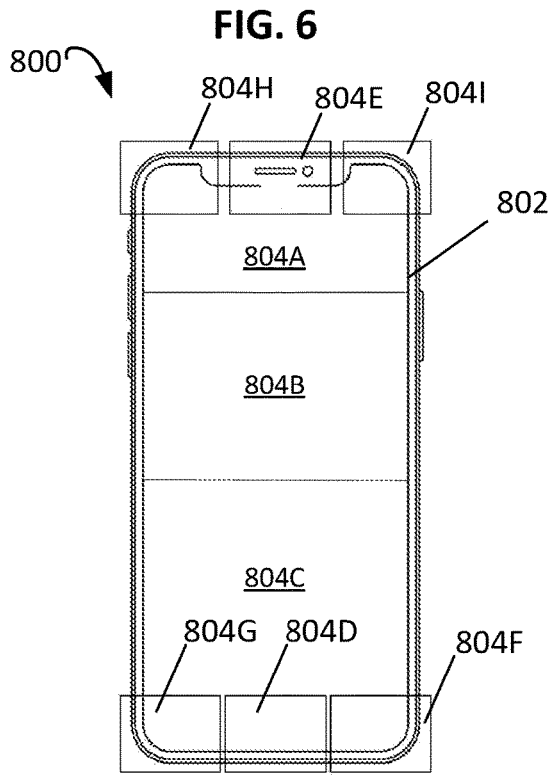

FIG. 8 illustrates an example mobile device 800 with a display 802 that is segmented into a plurality of zones 804A-804I. A controller responds to eye gaze in zones 804A-804C similarly to that which is stated above with respect to zones 604A-604C of FIG. 6.

When gaze is detected in zone 804D, the controller can scroll up until gaze is no longer detected in 804D (or scroll predetermined number of lines similar to touch gesture scroll). This can also include a full-page scroll in some embodiments. If a partial image is displayed in 804D and gaze is detected, controller can scroll until full view of image is displayed, or until an image is displayed in the center or top of screen.

When gaze is detected in zone 804E, the controller can scroll down/back until gaze no longer detected in 804E (or scroll predetermined number of lines similar to touch gesture scroll). This can also include a full-page scroll or scroll all the way back to the top of screen (similar to the touch gesture of tapping on the top of a mobile device screen). When gaze is detected in zone 804F, the controller can display the next page (paginated text) or next screen. When gaze is detected in zone 804G, the controller can present a previous page (paginated text) or previous screen. When gaze is detected in zone 804H, the controller can display a previous chapter/article/screen/home or menu button. When gaze is detected in zone 804I, the controller can activate a home button/menu button/settings, or the like.

It will be understood that zone controls can be interchanged or omitted, can also adapt to existing UI's/navigation bars. Zones 804D-804I could display buttons or indicators for their specific functionality. If gaze is detected in a particular zone, controller could highlight the zone where gaze is detected or show indicator of impending action for that zone. A controller can show a cursor indicator of where eye gaze is being detected, this can also be hidden. The controller can also detect when and where a clickable link, button or window is displayed and if gaze is focused on that position, link or button can be selected/clicked (the controller can also indicate to the user prior to clicking that impending action is about to occur). If a video is displayed on the screen and gaze is focused on the video for a certain period of time, video can automatically start playing and/or stop playing when gaze is not detected on the video.

Figure 9:
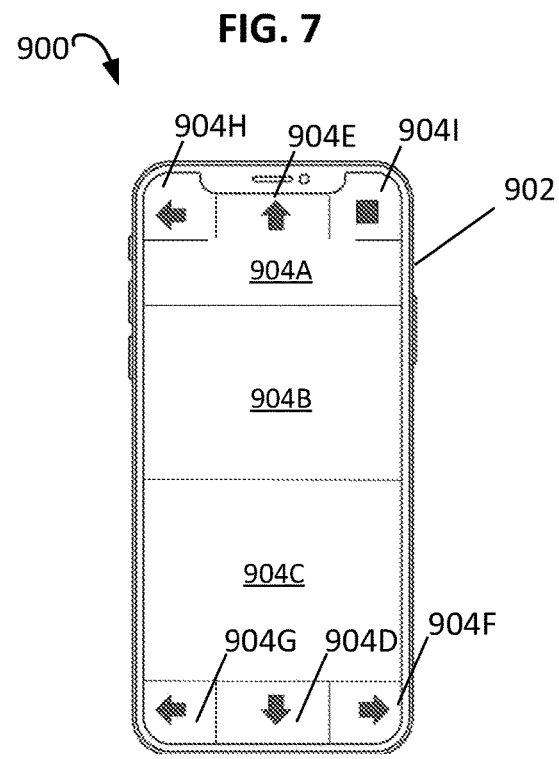

FIG. 9 illustrates an example mobile device 900 with a display 902 that is segmented into a plurality of zones 904A-904I. A controller responds to eye gaze in zones 904A-904C similarly to that which is stated above with respect to zones 604A-604C of FIG. 6. When a controller detects a gaze in zone 904D, the controller can scroll up until gaze is no longer detected in 904D (or scroll predetermined number of lines similar to touch gesture scroll). When a controller detects a gaze in zone 904E, the controller can scroll down until gaze no longer detected in zone 904E (or scroll predetermined number of lines similar to touch gesture scroll). This can also include a full page scroll or scroll all the way back to the top of screen (similar to the touch gesture of tapping on the top of a mobile device screen).

When a controller detects a gaze in zone 904F, the controller can display a next page (paginated text) or next screen. When a controller detects a gaze in zone 904G, the controller can present a previous chapter/previous article/previous page/go back button.

When a controller detects a gaze in zone 904H, the controller can present a previous chapter/previous article/previous page/go back button. When a controller detects a gaze in zone 904I, the controller can present a home button/menu button/settings for selection. Zone controls can be interchangeable or omitted, can also adapt to existing user interfaces or navigation controls. Zones 904D-904I could be visible to user at all times, or only sometimes, or only when gaze is detected on one of these zones. If gaze is detected in a particular zone, the controller could highlight the zone where gaze is detected or show indicator of impending action for that zone.

Figure 10:
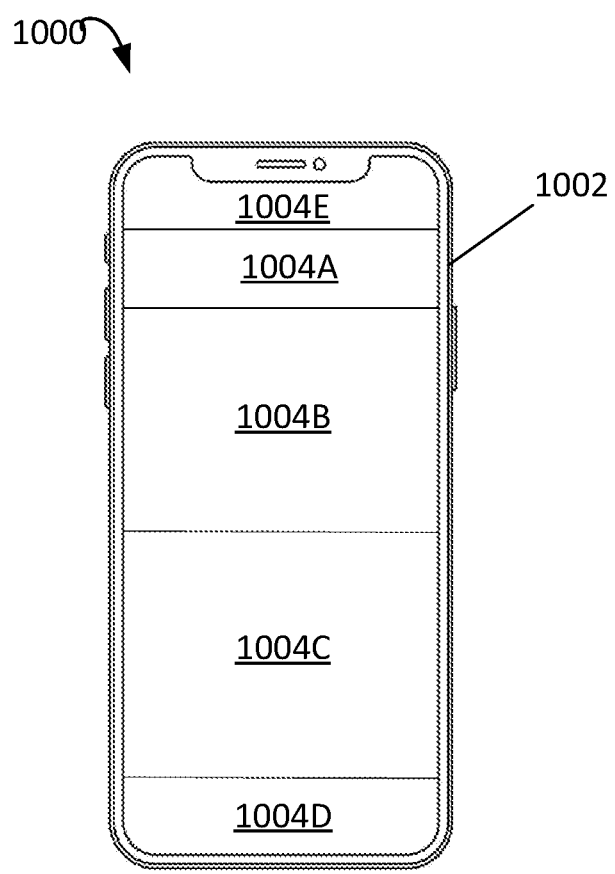

FIG. 10 illustrates an example mobile device 1000 with a display 1002 that is segmented into a plurality of zones 1004A-1004E. A controller responds to eye gaze in zones 1004A-1004C similarly to that which is stated above with respect to zones 604A-604C of FIG. 6.

When a controller detects an eye gesture (scroll down, swipe left swipe right) in zone 1004D, the controller can perform an associated input. When a controller detects an eye gesture (scroll up swipe left swipe right) in zone 1004D, the controller can perform an associated input. Reading, tap and zoom gestures can be detected anywhere on the display by the controller. The controller can detect when and where a clickable link, button or window is displayed and if gaze is focused on that position, link or button can be selected/clicked (system can also indicate to the user prior to clicking, that impending action is about to occur).

If a video window is displayed on the screen, if gaze is focused on the video for a certain period of time, video can automatically start playing, stop playing when gaze is not detected on the video. The size and shape of each zone can vary and be adjusted. In a different configuration, eye gestures could be detected anywhere on the display and not just in designated zones.

Figure 11:
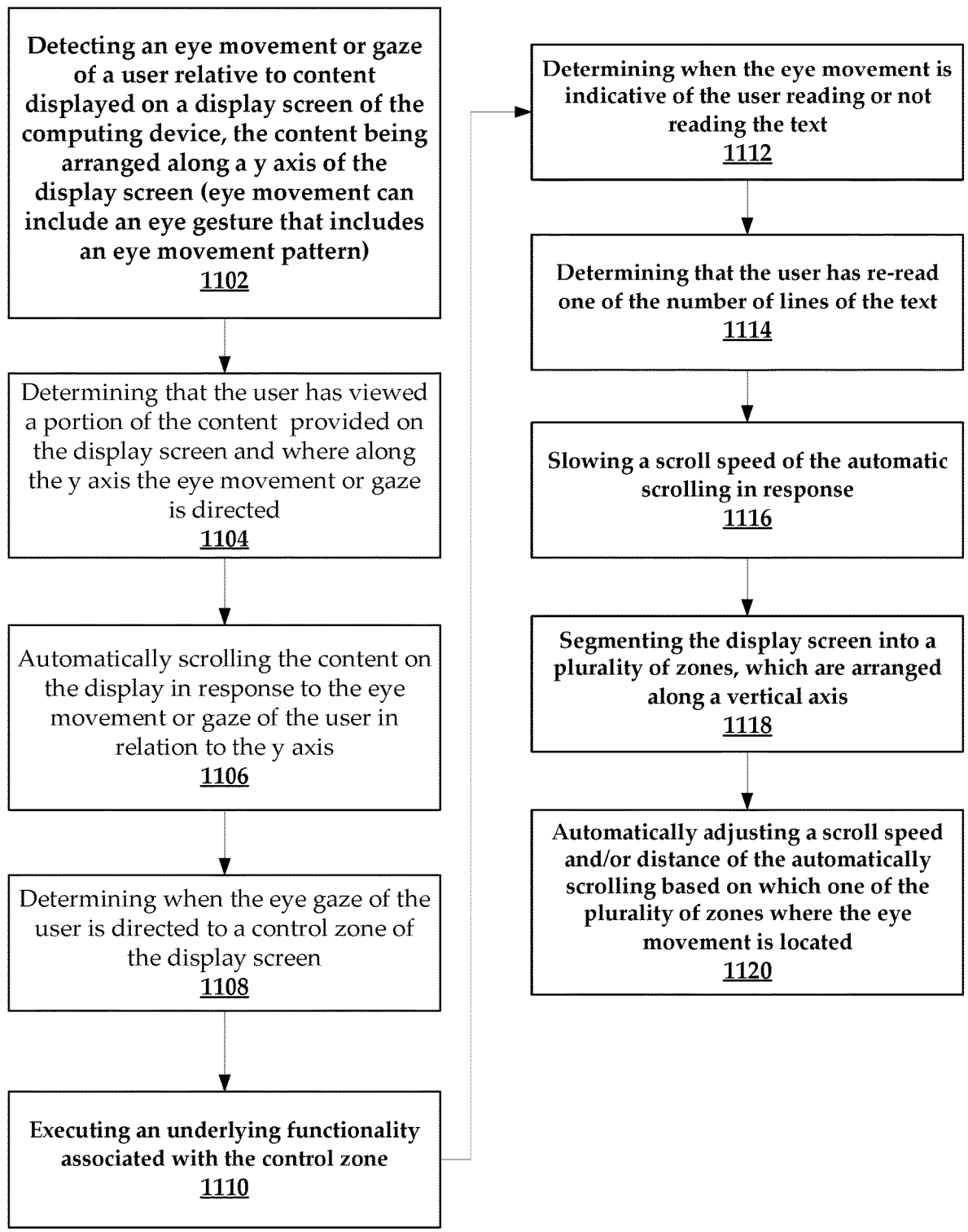
FIG. 11 is a flowchart of an example method of the present disclosure.

FIG. 11 is a flowchart of an example method. The method can include a step 1102 of detecting, via an eye tracking device of a computing device, an eye movement of a user relative to content displayed on a display screen of the computing device. It will be understood that the eye movement can include an eye gesture that includes an eye movement pattern. Various eye gestures are disclosed supra.

The method also includes a step 1104 of determining that the user has viewed a portion of the content in a target reading or viewing area of the display screen, along with a step 1106 of automatically scrolling the content displayed in the target reading area.

In some embodiments, the method can include a step 1108 of determining when the eye gaze of the user is directed to a control zone of the display screen, as well as a step 1110 of executing an underlying functionality associated with the control zone.

According to some embodiments, when the content includes text, the method further includes a step 1112 of determining when the eye movement is indicative of the user reading or not reading the text. In some embodiments, automatically scrolling comprises scrolling a number of lines of the text based on a reading speed of the user determined from the eye movement. In some instances, this can be based on the number of lines of text the user has read as well as the location on the display in which the lines were read.

In various embodiments, the method can include a step 1114 of determining that the user has re-read one of the number of lines of the text, along with a step 1116 of slowing/stopping a scroll speed of the automatic scrolling in response.

In one embodiment, the method includes a step 1118 of segmenting the display screen into a plurality of zones, which are arranged along a vertical axis, and a step 1120 of automatically adjusting a scroll speed and/or distance of the automatically scrolling based on which one of the plurality of zones where the eye movement is located.

In some embodiments, the method can include automatically adjusting the scroll speed and/or distance until the eye movement has adjusted to another one of the plurality of zones. Some embodiments include determining a reading speed for the user and adjusting the scroll speed of the automatically scrolling based on the reading speed, the reading speed being based on the eye movement. The method can also include adjusting the automatic scrolling based on manual scrolling by the user.

Figure 12:
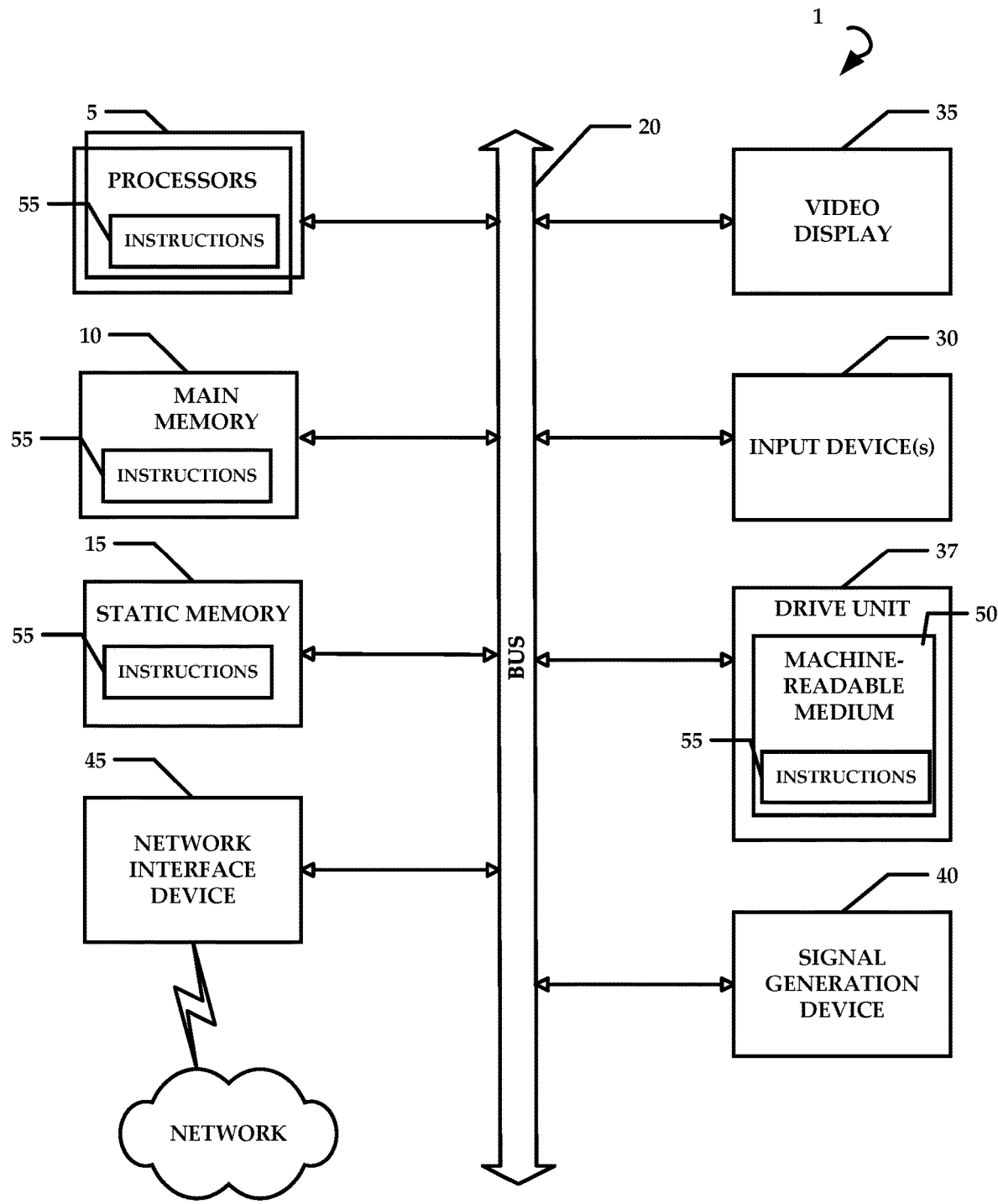
FIG. 12 is a simplified block diagram of a computing system, in accordance with some embodiments.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, heads-up display, wearable device, VR/AR glasses or goggles, hologram, digital billboard, watch, e-reader, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method comprising:
   detecting an eye movement or gaze of a user relative to content displayed on a display screen of a computing device, the content being arranged along a y axis of the display screen;
   determining that the user has viewed a portion of the content provided on the display screen and where along the y axis the eye movement or gaze is directed;
   determining a quantity of pixels for the portion of the content provided;
   determining that the quantity of pixels of the portion of the content provided comprises an image; and
   automatically scrolling the content on the display screen in response to the eye movement or gaze of the user in relation to the y axis, and based on the gaze of the user bypassing the image.

2. The method according to claim 1, wherein the automatically scrolling comprises scrolling one or more lines of text or paragraphs based on a number of lines read by the user, as determined from the eye movement of the user.

3. The method according to claim 1, wherein the eye movement includes an eye gesture that includes an eye movement pattern.

4. The method according to claim 1, further comprising:
   determining when the eye gaze of the user is directed to a control zone of the display screen; and
   executing an underlying functionality associated with the control zone.

5. The method according to claim 1, wherein when the content includes text, the method further includes determining when the eye movement is indicative of the user reading or not reading the text.

6. The method according to claim 5, wherein automatically scrolling comprises scrolling one or more lines of the text based on a number of lines read by the user, as determined from the eye movement.

7. The method according to claim 6, further comprising:
   determining that the user has re-read one of the one or more lines of the text; and
   slowing or stopping the automatic scrolling in response.

8. The method according to claim 1, further comprising segmenting the display screen into a plurality of zones, which are arranged along a vertical or horizontal axis.

9. The method according to claim 8, further comprising automatically adjusting a scroll distance and direction of the automatic scrolling based on which one of the plurality of zones where the eye movement or gaze is detected.

10. The method according to claim 9, further comprising automatically adjusting the scroll distance and direction until the eye movement or gaze has adjusted to another one of the plurality of zones.

11. The method according to claim 1, further comprising detecting at least one of a font size, a line height, and a spacing of the content; and the automatic scrolling being adjusted based on the at least one of the font size, the line height, and the spacing.

12. The method according to claim 1, further comprising adjusting the automatically scrolling based on manual scrolling by the user.

13. The method according to claim 1, further comprising detecting a low light environment surrounding the computing device and adjusting an eye tracking tolerance to improve a low light eye tracking accuracy.

14. A system comprising:
   a display screen;
   an eye tracking device; and
   a controller comprising:
      a memory; and
      a processor communicatively coupled to the memory, the memory storing instructions executable by the processor to perform a method comprising:
         detecting an eye movement or gaze of a user relative to content displayed on the display screen of a computing device, the content being arranged along a y axis of the display screen;
         determining that the user has viewed a portion of the content provided on the display screen and where along the y axis the eye movement or gaze is directed;
         determining a quantity of pixels for the portion of the content provided;
         determining that the quantity of pixels of the portion of the content provided comprises an image; and
         automatically scrolling the content on the display screen in response to the eye movement or gaze of the user in relation to the y axis, and based on the gaze of the user bypassing the image.

15. The system according to claim 14, wherein the automatically scrolling comprises scrolling one or more lines of text or paragraphs based on a number of lines read by the user, as determined from the eye movement of the user.

16. The system according to claim 14, wherein the eye movement includes an eye gesture that includes an eye movement pattern.

17. The system according to claim 14, further comprising:
   determining when the eye gaze of the user is directed to a control zone of the display screen; and
   executing an underlying functionality associated with the control zone.

18. The system according to claim 14, wherein when the content includes text, the method further includes determining when the eye movement is indicative of the user reading or not reading the text.

19. The system according to claim 18, wherein automatically scrolling comprises scrolling one or more lines of the text based on a number of lines read by the user, as determined from the eye movement.

20. The system according to claim 19, further comprising:
   determining that the user has re-read one of the one or more lines of the text; and
   slowing or stopping the automatic scrolling in response.

21. The system according to claim 14, further comprising segmenting the display screen into a plurality of zones, which are arranged along a vertical or horizontal axis.

22. The system according to claim 21, further comprising automatically adjusting a scroll distance and direction of the automatic scrolling based on which one of the plurality of zones where the eye movement or gaze is detected.

23. The system according to claim 22, further comprising automatically adjusting the scroll distance and direction until the eye movement or gaze has adjusted to another one of the plurality of zones.

24. The system according to claim 14, further comprising detecting at least one of a font size, a line height, and a spacing of the content; and the automatic scrolling being adjusted based on the at least one of the font size, the line height, and the spacing.

25. The system according to claim 14, further comprising adjusting the automatically scrolling based on manual scrolling by the user.

26. The system according to claim 14, further comprising detecting a low light environment surrounding the computing device and adjusting an eye tracking tolerance to improve a low light eye tracking accuracy.

27. A non-transitory computer readable medium having embodied thereon instructions, which when executed by a processor, perform steps of a method comprising:
   detecting an eye movement or gaze of a user relative to content displayed on a display screen of a computing device, the content being arranged along a y axis of the display screen;
   determining that the user has viewed a portion of the content provided on the display screen and where along the y axis the eye movement or gaze is directed;
   determining a quantity of pixels for the portion of the content provided;
   determining that the quantity of pixels of the portion of the content provided comprises an image; and
   automatically scrolling the content on the display screen in response to the eye movement or gaze of the user in relation to the y axis, and based on the gaze of the user bypassing the image.

28. The non-transitory computer readable medium according to claim 27, wherein the automatically scrolling comprises scrolling one or more lines of text or paragraphs based on a number of lines read by the user, as determined from the eye movement of the user.

29. The non-transitory computer readable medium according to claim 27, wherein the eye movement includes an eye gesture that includes an eye movement pattern.

30. The non-transitory computer readable medium according to claim 27, the method further comprising:
- determining when the eye gaze of the user is directed to a control zone of the display screen; and
- executing an underlying functionality associated with the control zone.

31. The non-transitory computer readable medium according to claim 27, wherein when the content includes text, the method further includes determining when the eye movement is indicative of the user reading or not reading the text.

32. The non-transitory computer readable medium according to claim 27, wherein automatically scrolling comprises scrolling one or more lines of the text based on a number of lines read by the user, as determined from the eye movement.

33. The non-transitory computer readable medium according to claim 32, the method further comprising:
- determining that the user has re-read one of the one or more lines of the text; and
- slowing or stopping the automatic scrolling in response.

34. The non-transitory computer readable medium according to claim 27, further comprising segmenting the display screen into a plurality of zones, which are arranged along a vertical or horizontal axis.

35. The non-transitory computer readable medium according to claim 34, the method further comprising automatically adjusting a scroll distance and direction of the automatic scrolling based on which one of the plurality of zones where the eye movement or gaze is detected.

36. The non-transitory computer readable medium according to claim 35, the method further comprising automatically adjusting the scroll distance and direction until the eye movement or gaze has adjusted to another one of the plurality of zones.

37. The non-transitory computer readable medium according to claim 27, the method further comprising detecting at least one of a font size, a line height, and a spacing of the content; and the automatic scrolling being adjusted based on the at least one of the font size, the line height, and the spacing.

38. The non-transitory computer readable medium according to claim 27, the method further comprising adjusting the automatically scrolling based on manual scrolling by the user.

39. The non-transitory computer readable medium according to claim 27, the method further comprising detecting a low light environment surrounding the computing device and adjusting an eye tracking tolerance to improve a low light eye tracking accuracy.

* * * * *